United States Patent [19]

Reid

[11] Patent Number: 4,626,350

[45] Date of Patent: Dec. 2, 1986

[54] FILTER CARTRIDGE

[76] Inventor: Roger P. Reid, 1920 Alder St., Caldwell, Id. 83605

[21] Appl. No.: 718,499

[22] Filed: Apr. 1, 1985

[51] Int. Cl.[4] .................. B01D 27/02; B01D 35/00
[52] U.S. Cl. ................................. 210/282; 210/352
[58] Field of Search ............... 210/282, 314, 439, 350, 210/351, 352

[56] References Cited

U.S. PATENT DOCUMENTS 3,411,629 11/1968 Wilber et al. ...................... 210/352

*Primary Examiner*—Frank Sever
*Attorney, Agent, or Firm*—Paul A. Weilen

[57] ABSTRACT

Multiple embodiments of a filter cartridge are disclosed, the cartridge preferably being adapted for use within a housing and including a tubular outer wall element with closures at either end, one of the closures being of unitary construction and comprising an annular ring portion for attachment to the tubular element and axially central portion. Flexible spring elements interconnect the central portion with the annular ring while being adapted for flexure into a stressed condition for urging permeable membrane portions within the ring against a filter medium contained within the cartridge for producing and maintaining a compacting force on the filter medium. Preferably, the unitary end closure cooperates with the tubular wall element and the other closure as well as with portions of the housing for assuring proper fluid flow through the filter medium. A method for filling the cartridge is also disclosed wherein the flexible spring assembly of the unitary end closure is maintained in a stressed condition until the cartridge is filled and assembled, the spring assembly then being released for causing permeable membrane portions within the ring to produce and maintain a compacting force on the filter medium.

30 Claims, 8 Drawing Figures

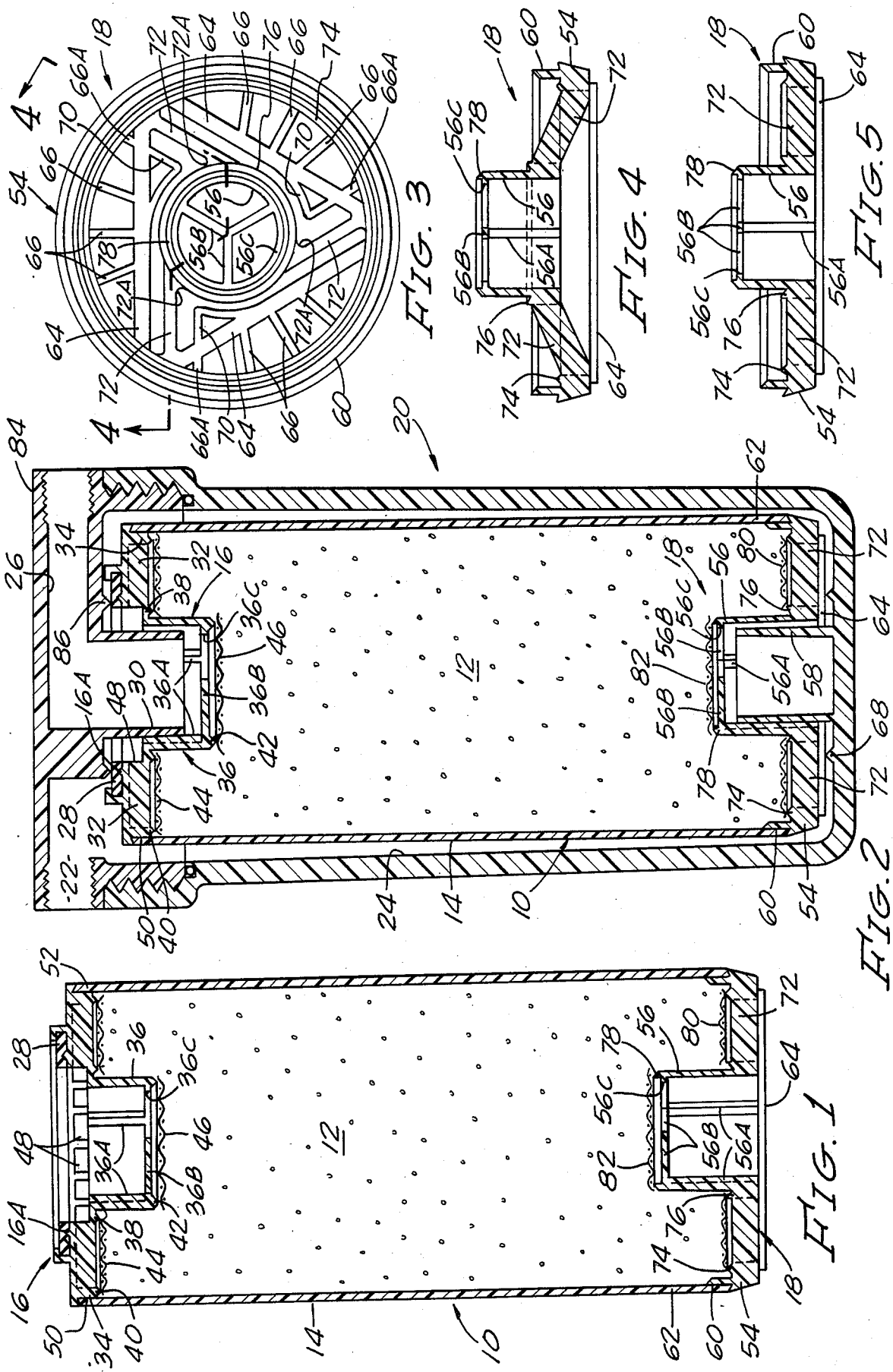

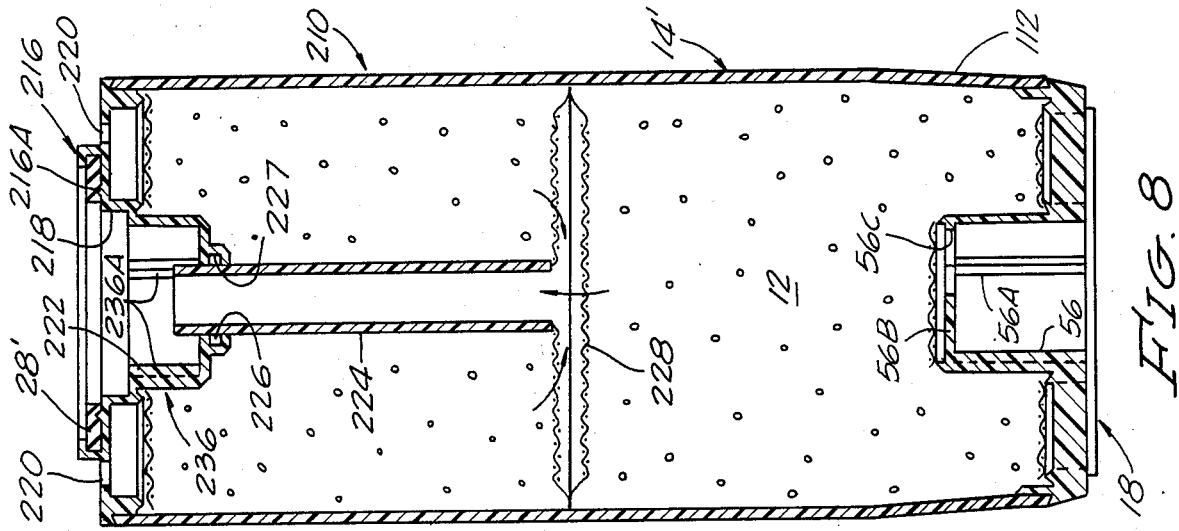
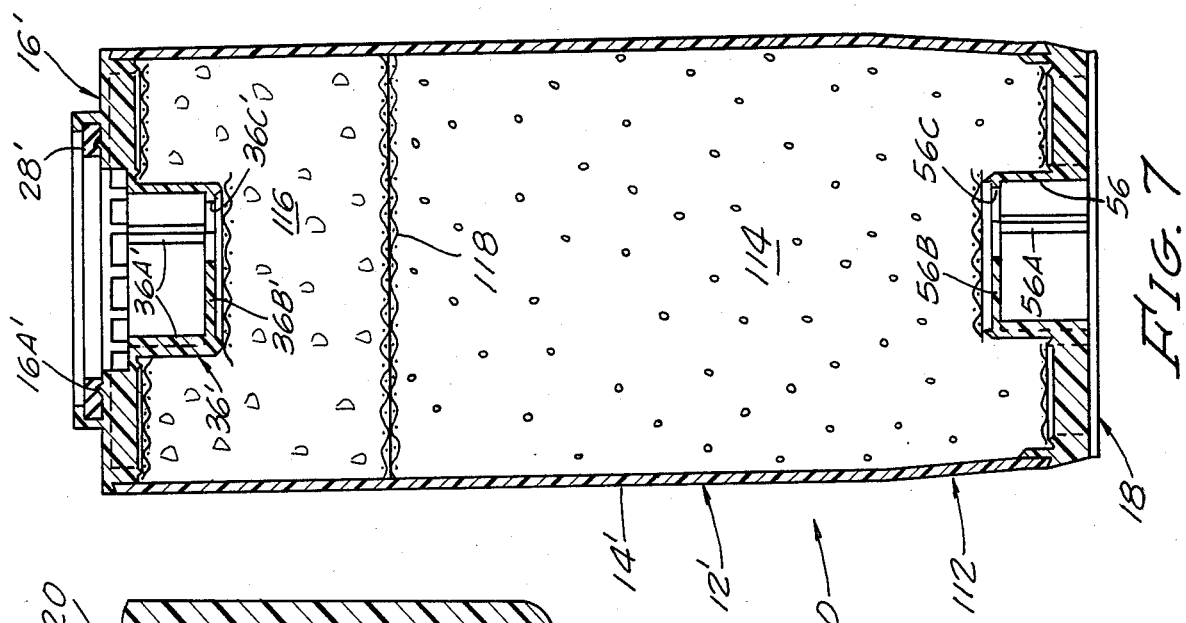
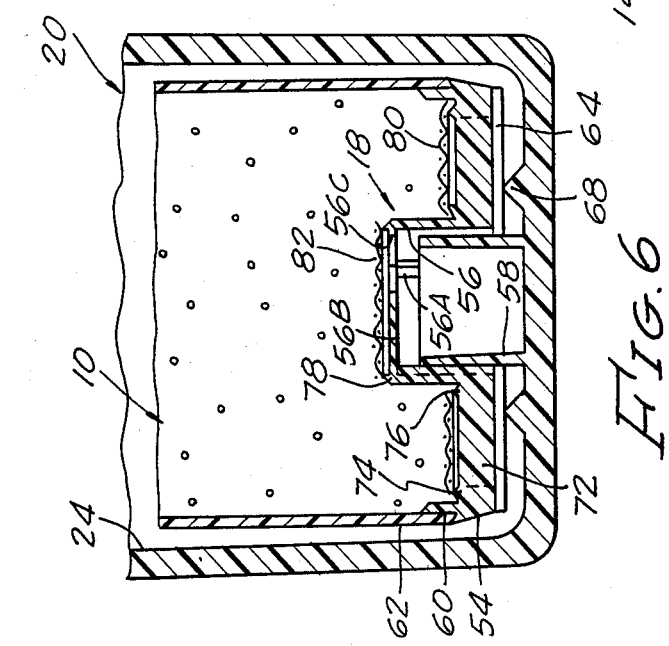

FILTER CARTRIDGE

BACKGROUND OF THE INVENTION

The present invention relates to filter cartridges and more particularly to filter cartridges adapted for containing a particulate filter medium through which a fluid is passed for removal of selected solid and/or liquid components.

Filters of the type contemplated by the present invention have commonly been employed for filtering fluids including liquids such as water where it is desirable to remove various components from an influent source of water in order to produce an effluent particularly suited for one purpose or another. For example, such filters are commonly employed in the softening of water where mineral impurities are removed by passing the water through a bed of ion exchange resins. Similarly, water and other liquids may be passed through a particulate filter medium such as activated carbon for removing various components which are undesirable, for example, because of undesirable tastes and odors in the water.

As is also well known in the prior art, such filter cartridges are adapted for in-line use where the filter is connected with a source of fluid to be filtered, the fluid passing through the filter medium of the cartridge into a suitable outlet. In other instances, the cartridge is employed in a housing forming inlet and outlet means for communicating influent to the filter and for receiving effluent from the filter cartridge in suitably filtered form. Where the filter cartridge is adapted for use in such a housing, the cartridge is commonly contemplated for replaceable use with the housing being a generally permanent part of an in-line arrangement.

In filter operations of the type referred to above, the filter cartridge is commonly formed with a tubular outer wall element and closures at either end. The filter element is provided with foraminous or permeable material in one or more of its components for forming inlet and outlet means by which fluid is caused to pass through a particulate filter medium contained within the cartridge. Preferably, within a cartridge of the type referred to above, the end closures are of foraminous or porous construction for allowing the fluid to enter into and exit from the cartridge while passing through the particulate filter medium.

Where the filter cartridge is of a type adapted for containing a particulate filter medium through which fluid passes for carrying out the filter operation, a common problem arises in assuring uniform flow of the fluid through the particulate medium. Uniform flow is necessary in order to assure proper contact of the fluid with the particulate filter medium and removal of undesirable components to pre-established limits. However, particularly where the fluid is caused to flow through the filter cartridge under pressure, the passage of fluid through the particulate filter medium over a period of time tends to result in cavitation or channeling with relatively open passages being formed through the filter medium. In such an event, the fluid is permitted to pass through the filter medium without uniformly contacting the filter medium as required for optimum filter results.

Numerous designs for filter cartridges have been provided in the prior art in an attempt to overcome these problems in connection with maintaining proper compaction and uniform flow distribution in particulate filter mediums. In this regard, it is generally understood that a particulate filter medium may experience compaction, relative packing or even some loss of particulate filter medium permitting the development of channeling or cavitation as discussed above. Accordingly, one approach contemplated by the prior art has been the employment of means within such filter cartridges having a tendency for continually compacting the particulate filter medium in order to prevent such problems. For example, U.S. Pat. No. 3,254,771 issued June 7, 1966 disclosed a filter assembly of the type contemplated by the present invention wherein a relatively complex spring mechanism was employed within a construction including a tubular outer wall housing, end closures and various other components, the spring mechanism being adapted for initiating and maintaining a compacting force upon the filter medium in order to prevent or minimize channeling or cavitation effects within the filter medium itself.

However, all of these prior art designs adapted for eliminating or minimizing the effects of channeling, cavitation and the like have been characterized either by relatively complex filter assembly construction or other problems.

Accordingly, there has been found to remain a need for an improved filter cartridge adapted for use with particulate filter medium through which fluid is passed for carrying out a filter operation. As noted above, a particular area of improvement contemplated by the present invention lies in the need for preventing channeling or cavitation from occurring within the particulate filter medium.

SUMMARY OF THE INVENTION

It is therefore an object of the invention to provide an improved filter cartridge adapted for use with a particulate filter medium while overcoming one or more problems of the type described above.

It is a further object of the invention to provide such an improved filter cartridge which is of relatively simple construction in order to minimize production costs and to simplify procedures for filling the filter cartridge while assuring proper compaction of the particulate filter medium over extended periods of use.

A further object of the invention is to provide a filter cartridge adapted for use with a novel method for filling the cartridge with particulate filter medium in a manner as hereinafter described.

It is a more specific object of the invention to provide such a filter cartridge including a tubular outer wall element with closures at either end, one of the closures being of unitary construction and including resilient means formed as an integral portion of the closure, the resilient or spring means being adapted for flexure into a stressed condition for producing and maintaining a compacting force on a particulate filter medium contained within the filter cartridge over an extended period of filtering operation.

It is a further object of the invention to provide such a cartridge wherein the unitary end closure includes annular ring means adapted for attachment to the tubular outer wall element, flexible spring means interconnecting the annular ring means with an axially central portion while being adapted for flexure into a stressed condition for urging the central portion against the particulate filter medium in the manner referred to above.

It is an even further object of the invention to provide such a filter cartridge wherein the unitary end closure comprises a rigid beam construction interconnected with the outer annular ring for resisting undesirable deformation of the closure.

It is a related object of the invention to provide such a filter cartridge wherein the flexible spring means is formed by flexible beams preferably of axially inclined arrangement for interconnection between the axially central portion of the unitary closure and the outer annular ring, the flexible beams preferably being interconnected with the outer annular ring through the rigid beam structure referred to above.

Additional objects and advantages of the invention are made apparent in the following description having reference to the accompanying drawings.

BRIEF DESCRIPTION OF THE DRAWINGS

FIG. 1 is a vertical sectional view of a filter cartridge constructed in accordance with the present invention.

FIG. 2 is a similar view of the filter cartridge of FIG. 1 preferably adapted for use in a housing forming inlet and outlet means for establishing fluid communication with the filter cartridge.

FIG. 3 is a plan view of a unitary end closure adapted for use within the filter cartridge of FIGS. 1 and 2, said unitary end closure being illustrated separately from other components of the filter cartridge.

FIG. 4 is a view taken on the staggered section line 4—4 of FIG. 3.

FIG. 5 is a view similar to FIG. 4 of the unitary end closure, but with its axially central portion being retracted into a stressed condition as will be hereinafter described in greater detail.

FIG. 6 is an enlarged view in cross section of the lower end of the filter cartridge and housing of FIG. 2 in order to better illustrate the manner in which a unitary end closure of the filter cartridge cooperates with the housing.

FIG. 7 is a vertical sectional view of another embodiment of a filter cartridge constructed in accordance with the present invention, said filter cartridge having a tapered outer wall element in order to increase the particulate filter medium capacity of the cartridge, and also being adapted for containing different types of particulate filter medium through which the fluid is passed in series.

FIG. 8 illustrates a further embodiment of a filter cartridge constructed in accordance with the present invention, said embodiment being adapted for flow of fluid therethrough at an increased rate with fluid being introduced at both ends of the cartridge and allowed to exit through an axially arranged outlet at one end thereof.

DESCRIPTION OF THE PREFERRED EMBODIMENTS

Referring now to the drawings and particularly to FIGS. 1 and 2, a filter cartridge constructed in accordance with the present invention is generally indicated at 10 for confining a particulate filter medium 12 and allowing influent fluid to be circulated therethrough to perform a filtering operation.

In general, the filter cartridge 10 includes a tubular outer wall element 14 with closures 16 and 18 at its opposite ends. The closures 16 and 18 include permeable components for allowing fluid to enter into and exit from the cartridge, and the closure 18 is constructed and arranged to perform the various novel and important functions hereinafter described.

The cartridge 10 is preferably adapted for use, in a replaceable manner, within a housing 20 as illustrated in FIG. 2. The housing 20 includes an inlet passage 22 for admitting fluid into the housing interior 24 and for circulation through the cartridge 10. An outlet passage 26 is also formed by the housing 20 for permitting fluid to exit from the cartridge 10 and housing 20 in a filtered condition as hereinafter described. The housing 20 is of generally conventional construction in accordance with the prior art, the cartridge 10 being particularly adapted for use with conventional housings as described hereinafter in greater detail.

In further accordance with the present invention, one of the end closures, for example that indicated at 18 in FIGS. 1 and 2, is of unitary construction and includes flexible spring means for maintaining a continuous compacting force or force of compression on the filter medium in order to eliminate or minimize tendencies of the filter medium to exhibit channeling or cavitation which would interfere with optimum performance of the filter cartridge.

In addition to the function of maintaining a constant compacting force on the filter medium, the unitary end closure 18 performs three additional functions within the present invention. Those functions are as follows: (1) the end closure 18 is secured to one end of the tubular outer wall element 14 and provides support for the tubular element 14 to prevent it from collapsing under pressures developed during filtering operations; (2) the unitary end closure 18 also functions in combination with the tubular element 14 and the other end closure 16 for applying force on an annular seal element 28 as illustrated in both of FIGS. 1 and 2 in order to assure that fluid is properly circulated through the filter cartridge within the housing 20 and to assure optimum filtering performance; and (3) the unitary end closure 18 is also constructed in a manner hereinafter described in greater detail in order to support fluid permeable material generally across its entire cylindrical dimension in order to promote uniform access of the influent into the entire cross section of the particulate filter medium 12.

The manner in which the unitary end closure 18 performs the above function, as well as other novel features of the invention, will be apparent in the following description.

Referring initially to FIG. 2, the outside diameter of the cartridge 10 is smaller than the interior 24 of the housing 20 so that fluid from the inlet 22 passes downwardly through the housing about the cartridge 10 in order to enter the cartridge through the unitary end closure 18 for contact with the particulate filter medium 12. In the embodiment of FIGS. 1 and 2, the end closure 16 is designed, as will be described in greater detail below, to prevent access of fluid from the inlet 22. Thus, all fluid is caused to enter the cartridge through the unitary end closure 18.

The end closure 16 is designed to permit a generally maximum amount of particulate filter medium 12 to be packed within the cartridge 10. At the same time, the end closure 16 is designed to permit filtered fluid having passed through the particulate filter medium 12 to exit from the cartridge across substantially the entire surface of the end closure 16, all of the fluid exiting through the end closure 16 being directed toward the axially arranged portion 30 of the outlet passage 26.

In order to perform the functions described above, the end closure 16 includes an arrangement of spaced radially arranged ribs or beams 32 secured between an outer annular ring 34 and an inner annular element 36. The annular element 36 forms an annular edge 38 which is generally coplanar with an annular edge 40 formed by the outer annular ring 34. Another annular edge 42 is formed at the bottom of the inner annular element 36 as seen in FIGS. 1 and 2. In order to confine the particulate filter medium 12 within the cartridge and also to permit fluid to exit throughout the entire cross section of the end closure 16, a permeable felt material, formed for example from polypropylene, is applied to the annular edges 38, 40 and 42, for example, by sonic welding or by gluing. In particular, an annularly shaped portion 44 of permeable material is secured to the annular edges 38 and 40 while a circular portion 46 of permeable material is secured to the annular edge 42 on the element 36.

As may be seen in FIG. 2, fluid passes from the particulate filter medium 12, through the circular permeable material 46 and directly into the axial portion 30 of the outlet passage 26. In order to permit fluid passing through the annular permeable material 44 to also exit through the outlet 26, the inner annular element 36 is formed with radially facing openings 48. The inside diameter of the annular element 36 is also larger than the axial outlet portion 30 so that fluid passing through the permeable material 44 flows through the radial openings 48 and downwardly between the annular element 36 and axial outlet portion 30 for communication with the outlet passage 26.

The inside diameter of the annular element 36 is integrally formed with three circumferentially spaced apart, axially arranged ribs 36A. At the bottom of the element 36, as viewed in FIG. 2, connectors 36B extend radially inwardly from the ribs 36A and are joined with each other along the axis of the element 36. The ribs 36A and connectors 36B center the closure 16 on the element 30 without disturbing flow characteristics in the cartridge 10. An annular ring 36C, of similar dimension as the ribs 36A, is formed at the bottom of the element 36, as viewed in FIG. 2, to support the element 36 during welding of the permeable material thereto.

Referring further to FIG. 2, the annular seal 28 prevents fluid entering the housing 20 through the inlet 22 from mingling with filtered fluid flowing through the end closure 16 toward the outlet passage 26. The manner in which sealing engagement is maintained for the annular seal 28 is described in greater detail below. However, it is noted that the closure 16 is formed with a sharp, annular projection 16A for engaging the seal 28 and assuring sealing engagement therewith.

To complete the description of the end closure 16, its outer annular ring 34 is formed with an annular counterbore 50 adapted for receiving one end 52 of the tubular outer wall element 14. The upper end 52 of the tubular element 14 is secured to the end closure 16, for example, by sonic welding, spin welding or gluing.

Reference is now had to the lower portions of FIGS. 1 and 2, as well as to FIGS. 3-5.

In order to accomplish the function outlined above, the unitary closure 18 is also formed with an outer annular ring 54 and an inner annular element 56. The inside diameter of the inner element 56 is arranged in spaced apart relation about an axially arranged tubular projection 58 on the housing 20. The outer annular ring 54 forms a counterbore 60 for receiving a lower end 62 of the tubular element 14. As described above for the upper end 52 of the tubular element 14, its lower end 62 is similarly secured to the counterbore 60, for example, by sonic welding, spin welding or gluing.

The element 56 is formed with ribs 56A, connectors 56B and an annular ring 56C which are similarly formed and serve the same purpose as the corresponding features on the annular element 36. The construction of the element 56 in this regard, as well as the construction of the similar features of element 36, may be best seen in FIG. 3.

Rigidity is provided within the unitary end closure 18 by a triangular arrangement of beams 64, each of the beams 64 being interconnected at both ends with the outer annular ring 54. The beams 64 are of relatively massive proportions and are further reinforced by bridge elements 66 as best seen in FIG. 3. Four bridge elements 66 are interconnected between the outer annular ring 54 and each of the triangularly arranged beams 64 in order to provide reinforcement both for the triangularly arranged beams 64 and also for the outer annular ring 54.

Continuing with the reference to FIG. 3 as well as FIG. 2, the triangularly arranged beams 64 are positioned so that they overlap an annular projection 68 on the housing 20 as shown in FIG. 2. The configuration of the annular projection 68 is also illustrated in broken lines in FIG. 3 for the purpose of better illustrating its interaction with the triangular beams 64. An angled beam or bridge 70 forms a triangle with each of the beams 64 and extends inwardly to overlap the annular projection 68 and provide additional support as will be made more apparent in the following description. One of the bridge elements 66A is formed as an extension of one leg of each angled beam 70 to further strengthen the beams 70.

An important feature of the present invention concerns a resilient spring means interconnecting the outer annular ring 54 and more particularly the structural beams 64 with the inner annular element 56 forming an axially central portion of the unitary closure 18.

A number of configurations are possible for this integral or unitary resilient spring feature of the closure 18. Preferably, as best seen in FIGS. 3-5, the resilient spring means comprises a plurality of beams 72 respectively extending inwardly from the outer annular ring 54 and the structural beam assembly 64 for engagement with the annular element 56. Referring particularly to FIGS. 3 and 4, the spring beams 72 are arranged in generally tangential relation with the inner annular element 56. In their relaxed positions the spring beams 72 have their inner ends inclined toward the axial center of the cartridge 10 and toward the end closure 16 at the opposite end of the cylinder. The spring beams 72 are also of relatively substantial cross section in order to apply a substantial force between the outer annular ring 54 and the inner annular element 56 when the spring beams 72 are in a stressed condition as hereinafter discussed in greater detail. The acute intersections of the beams 72 with the annular element 56 are radiused or formed with a fillet 72A to minimize structural damage and avoid stress concentration when the inner annular element is flexed into its stressed condition.

Before discussing the function of the beams 72 in greater detail, it is noted with reference to FIGS. 1 and 2 that annular edges 74 and 76 are formed adjacent the outer annular ring 54 and the inner annular element 56. Another annular edge 78 is also formed on the upper end of the inner annular element 56. Here again, permeable felt membranes preferably formed from polypropylene are secured to the annular edges in the same manner described above in connection with the end closure 16. In particular, an annularly shaped portion 80 of permeable material is secured between the edges 74 and 76 while a circular portion 82 of porous material is secured to the edge 78. Thus, the porous materials 80 and 82 permit fluid from the inlet 22 to enter into contact with the particulate filter medium 12 across substantially the entire cross section of the cartridge 10.

In order to assure freedom for fluid from the inlet 22 to flow radially between the lower end of the housing 20 and the unitary end closure 18, the structural or triangularly arranged beams 64 and 70 are slightly extended with respect to the outer annular ring 54. Thus, if the annular edge 68 should penetrate into the beams 64,70, downward movement of the unitary end closure 18 would be limited by the beams 64, 70 so that fluid from the inlet 22 could still flow between the outer annular ring 54 and the bottom of the housing 20.

The unitary end closure 18, as illustrated in FIG. 4, shows the spring beams 72 in a generally relaxed condition, with the inner annular element 56 positioned substantially above the bottom of the outer annular ring 54. At the same time, in the relaxed position of FIG. 4, the annular edge 76 on the inner annular element 56 is raised substantially above the annular edge 74 on the outer annular ring 54. This construction permits the central portion or inner annular element 56 of the unitary closure 18 to be retracted or shifted downwardly to a position illustrated in FIG. 5 where the lower end of the inner annular element 56 is generally flush with the lower end of the outer annular ring 54. At the same time, in the stressed condition of FIG. 5, the annular edge 76 is generally flush or even with the outer annular edge 74 as is also illustrated in FIGS. 1 and 2.

Thus, the unitary construction of the closure 18 provides a novel means for maintaining continuous compacting force upon the particulate filter medium 12. The manner in which the closure 18 provides this function is set forth in the following description of the method for filling the cartridge 10 with particulate filter medium 12. Although the method of filling the cartridge is believed apparent from the preceding description, that method is described below in order to assure a more complete understanding of the invention.

The unitary end closure 18 is constructed in the manner illustrated in FIG. 2 with the permeable membrane material 80 and 82 in place thereupon. The unitary end closure 18 is then secured to the tubular outer wall element 14, for example, by gluing, spin welding or sonic welding the lower end 62 of the tubular element 14 to the counterbore 60 on the unitary closure 18.

With the unitary closure secured to the tubular element 14, the central portion or inner annular element 56 of the closure 18 is retracted to the position generally illustrated in FIG. 5, for example, by inserting an inside collet (not shown) into the inner bore of the annular element 56 and forcing it downwardly to the position of FIG. 5.

With the unitary closure 18 being stressed into the position illustrated in FIGS. 1, 2 and 5, the cartridge 10 is then filled with a selected particulate filter medium such as activated carbon. The particulate filter medium is generally compacted, for example, by tamping or by vibration, in order to assure complete filling of the cartridge. After the cartridge has been filled, the upper closure 16 with the permeable membrane material 44 and 46 in place is secured to the upper end 52 of the tubular element 14. With the cartridge in this condition, the particulate filter medium completely fills the space defined between the end closures 16 and 18.

The central portion or inner annular element 56 of the closure 18 is then released so that the spring beams 72 tend to urge the central portion or inner annular element 56 upwardly as viewed in FIGS. 1 and 2. At the same time, additional compressive force is applied to the filter medium 12 by action of the beams 72 through the annular permeable membrane 80. Thus, compressive force tends to be applied across the entire cross section of the cartridge 10 through the permeable membrane 82 mounted on the annular element 56 and the annular membrane 80 positioned above the beams 72. Even after release of the inner annular element 56, the precompacted form of the filter medium 12 prevents the annular element 56 from returning to its relaxed position illustrated in FIG. 4. Thus, the unitary end closure 18 serves to maintain a continuous compacting or compressing force upon the filter medium 12 in order to prevent cavitation or channeling as discussed above.

With the assembled cartridge 10 arranged in the housing 20 as illustrated in FIG. 2, it may be further seen that the generally rigid beams 64 and the outer annular ring 54 reinforce the tubular element 14 as noted above. At the same time, the cartridge 10 is trapped within the housing by a cover 84 threaded to the housing 20. The cover 84 forms the inlet and outlet passages 22 and 26 as previously described.

With the cartridge 10 assembled within the housing 20, the unitary closure 18 cooperates with the tubular element 14 and upper closure 16 for urging the seal 28 into sealing engagement with an annular edge 86 formed on the threaded cover 84 of the housing 20. As illustrated in FIG. 2, the unitary closure 18 rests upon the annular edge or projection 68, the generally rigid beams 64 and outer annular ring 54 transferring an upward force through the tubular element 14 to urge the upper closure 16 upwardly in order to apply compressive force between the annular edge or projection 86 and the annular seal 28.

Thus, there has been described a particularly effective filter cartridge including a unitary closure capable of performing a number of functions as described above.

Another embodiment of a filter cartridge constructed in accordance with the present invention is illustrated in FIG. 7 and generally indicated at 110. Within the filter cartridge 110 the unitary end closure 18 again serves as a closure for a tubular outer wall element 14'. However, the tubular element 14' includes an annularly tapered portion generally indicated at 112 so that the upper portion of the tubular element has an increased diameter in order to provide greater internal capacity within the cartridge for particulate filter medium 12'. An upper end closure 16' is generally similar to the end closure 16 of FIGS. 1 and 2 except that the end closure 16' is of greater diameter in order to compensate for the annular taper 112 in the tubular element 14'.

The embodiment of FIG. 7 also contains different particulate filter medium materials which are contacted in series by fluid passing through the cartridge 110. For example, activated carbon is arranged in a lower portion of the tubular element 14' as generally indicated at 114. Another particulate filter medium material such as polyphosphate crystals, for example, is then arranged in an upper portion of the cartridge as generally indicated at 116.

A permeable barrier 118 is arranged between the two different particulate filter medium materials in order to assure continued flow of fluid upwardly through the cartridge while maintaining the different particulate filter medium materials in separation from each other. Preferably, the permeable barrier 118 is formed with one or more layers of the same material forming the permeable materials 44, 46 and 80, 82 described above.

Otherwise, the cartridge 110 of FIG. 7 is filled and operated in the same manner described above for the filter cartridge 10. The only exception is that during filling, activated carbon material 114 is first arranged within the tubular element 14' followed by installation of the permeable barrier 118, the polyphosphate crystals 116 then being arranged in the upper end of the tubular element 14'.

Yet another embodiment of a filter cartridge constructed in accordance with the present invention is indicated at 210 in FIG. 8. Here again, the lower closure 18 and the tapered tubular element 14' are the same as described above in FIG. 7. The upper end closure 216 differs from the upper end closures 16 and 16' as described above in that the closure 216 does not include the radially facing openings 48. Rather, the end closure 216 is formed with a solid annular portion as indicated at 218. In addition, the upper end closure 216 is formed with axially extending openings 220. With the cartridge 210 arranged in a housing such as that indicated at 20 in FIG. 2, fluid from the inlet 22 would enter through the lower end closure 18 as described above and also through the openings 220 in the upper end closure 216. The cartridge 210 of FIG. 8 is again uniformly filled with a particulate filter medium 12' as with the embodiment of FIGS. 1 and 2. However, in the embodiment of FIG. 8, an inner annular element 222 of the upper end closure 216 provides a sealed engagement with an axial tube 224 by means of an O-ring 226 arranged in a machined groove 227, the axial tube 224 which is not permeable to fluid passage extending downwardly generally to the axial mid-length of the cartridge 210 into engagement with a permeable manifold 228 extending across the tubular element 14'.

In operation, fluid enters through the lower closure 18 and also through the openings 220 in the upper closure 216. Fluid passing both upwardly and downwardly through the particulate filter medium 12' enters the permeable manifold 228 and is communicated through the tube 224 upwardly toward an axial outlet passage as provided, for example, in the housing 20 of FIG. 2.

Thus, in the embodiment of FIG. 8 compared to the embodiment of FIG. 2, half of the fluid to be filtered passes through half of the filter medium either in the lower or upper half of the cartridge 210. At the same time, the fluid passes through the filter cartridge of FIG. 8 generally at half speed and half pressure in comparison with the embodiment of FIGS. 1 and 2. The reduced fluid velocity made possible in the embodiment of FIG. 8 serves to further limit cavitation. In addition, the embodiment of FIG. 8 is primarily intended for use where reduced velocity permits more intimate contact of fluid with the filter medium, for example, to increase the effectiveness of filtration within the cartridge 210.

In all of the above embodiments, the various parts of the filter cartridges 10, 110 and 210 are preferably formed of a plastic, namely, polypropylene. Housing units for the cartridges, such as that indicated at 20 in FIG. 2, are also preferably formed from plastic.

Thus, there have been disclosed various embodiments of filter cartridges as constructed in accordance with the present invention. Various modifications and additions are believed obvious within the invention in addition to those described above. Accordingly, the present invention is defined only by the following appended claims.

What is claimed is:

1. A cartridge adapted for containing a generally compacted particulate medium through which a fluid is passed to perform a filtering operation, comprising:
   a tubular outer wall element,
   a first closure element secured to one end of said tubular element,
   fluid permeable means for restraining the particulate medium, and
   a unitary end closure integrally including annular ring means having means for attachment to the other end of said tubular element, an axially central portion and flexible spring means forming at interconnection between said central portion and said annular ring means,
   said fluid permeable means being operatively coupled with said central portion for acting against the particulate medium,
   said flexible spring means being adapted for flexure from a non-stressed condition into a stressed condition for urging said central portion against the filter medium and toward the one end of said tubular element for producing and maintaining a compacting force on the filter medium sufficient to inhibit channeling or cavitation of the filter medium.

2. The cartridge of claim 1 being further adapted for arrangement in a housing comprising means for permitting fluid to enter the cartridge, pass through the filter medium and then exit from the cartridge and housing in a filtered condition.

3. The cartridge of claim 2 wherein said first closure element includes axially arranged means for communicating fluid exiting the cartridge with outlet means axially arranged on the housing, annular seal means being arranged for sealing engagement between the housing and said first closure element about the outlet means, said unitary end closure comprising means arranged for interaction with an adjacent portion of the housing to apply force axially through said tubular element for urging said first closure element into sealing engagement with said seal means and for urging said seal means into sealing engagement with the housing.

4. The cartridge of claim 3 further comprising a relatively rigid beam structure interconnected with said annular ring means, said flexible spring means comprising a plurality of flexible beams interconnected between said rigid beam structure and said central portion.

5. The cartridge of claim 4 wherein the housing is formed with axially projecting annular means adjacent said unitary end closure, said rigid beam structure being arranged for engagement with the axially projecting annular means.

6. The cartridge of claim 5 wherein said rigid beam structure is axially offset relative to said annular ring means to assure flow space between said annular ring means and the housing.

7. The cartridge of claim 4 wherein said attachment means on said annular ring means comprises an annular surface arranged for engagement with said tubular element to further rigidify said annular ring means and said rigid beam structure.

8. The cartridge of claim 4 further comprising a plurality of reinforcing and rigidifying bridge members interconnecting said rigid beam structure with said annular ring means.

9. The cartridge of claim 4 wherein said flexible beams extend radially inwardly while being inclined axially toward said one end of said tubular element for connection with said central portion.

10. The cartridge of claim 9 wherein said cnetral portion is a cylindrical element, a circular membrane means permeable to fluid flow spanning said cylindrical element and said fluid permeable means comprises an annularly shaped membrane means interconnected between said annular ring and said cylindrical element for containing the filter medium, said rigid beam structure and said flexible beams being configured for allowing fluid flow into the filter medium through both said circular and annular shaped membrane means.

11. The cartridge of claim 10 wherein additional compacting force is produced and maintained on the filter medium through said annularly shaped membrane means.

12. The cartridge of claim 11 wherein said annularly shaped membrane means is arranged for interaction with said flexible beams.

13. The cartridge of claim 9 wherein said central portion comprises a cylindrical element, said rigid beam structure comprising a triangular arrangement of three beams each connected at both ends with said annular ring means, said plurality of flexible beams comprising a flexible beam extending from each said rigid beam in generally tangential relation with said cylindrical element of said central portion.

14. The cartridge of claim 9 wherein said flexible beams are arranged in generally tangential relation with a cylindrical element of said central portion.

15. The cartridge of claim 3 wherein said first closure element comprises a cylindrical column, a circular membrane means permeable to fluid flow spanning said column and an annularly shaped membrane means permeable to fluid flow being interconnected between said cylindrical column and a radially outer portion of said first closure element for containing the filter medium, said cylindrical column being formed with a plurality of radially facing openings for communicating filtered fluid passing through said annularly shaped membrane means toward said axially arranged outlet means.

16. The cartridge of claim 1 wherein said tubular element includes an annular taper, said one end and said other end of said tubular element being of different diameters to facilitate their attachment to closures of different sizes.

17. The cartridge of claim 1 further comprising a relatively rigid beam structure interconnected with said annular ring means, said flexible spring means comprising a plurality of flexible beams interconnected between said rigid beam structure and said central portion.

18. The cartridge of claim 17 further comprising a plurality of reinforcing and rigidifying bridge members interconnecting said rigid beam structure with said annular ring means.

19. The cartridge of claim 17 wherein said flexible beams extend radially inwardly while being inclined toward said one end of said tubular element for connection with said central portion.

20. The cartridge of claim 19 wherein said central portion comprises a cylindrical element, said rigid beam structure comprising a triangular arrangement of three beams each connected at both ends with said annular ring means, said plurality of flexible beams comprising a flexible beam extending from each said rigid beam in generally tangential relation with said cylindrical element of said central portion.

21. The cartridge of claim 19 wherein said flexible beams are arranged in generally tangential relation with a cylindrical element of said central portion.

22. The cartridge of claim 1 wherein said flexible spring means comprise a plurality of flexible beams extending radially inwardly while being inclined toward said one end of said tubular element, said flexible beams further being arranged in generally tangential relation with a cylindrical element of said central portion.

23. A unitary end closure for a cartridge containing a generally compacted particulate filter medium through which a fluid passes to perform a filtering operation, the cartridge including a tubular outer wall element and a first closure element secured to one end of the tubular element, the unitary end closure integrally comprising:
  annular ring means having means for attachment to the other end of the tubular element,
  an axially central portion, and
  flexible spring means forming an interconnection between said central portion and said annular ring means, said flexible spring means being adapted for arrangement from a non-stressed condition to a stressed condition for urging said central portion against the filter medium through fluid permeable means and toward the one end of the tubular element for producing and maintaining a compacting force on the filter medium sufficient to inhibit channeling or cavitation of the filter medium.

24. The unitary end closure of claim 23 further comprising a relatively rigid beam structure interconnected with said annular ring means, said flexible spring means comprising a plurality of flexible beams interconnected between said rigid beam structure and said central portion.

25. The unitary end closure of claim 24 further comprising a plurality of reinforcing and rigidifying bridge members interconnecting said rigid beam structure with said annular ring means.

26. The unitary end closure of claim 24 wherein said flexible beams extend radially inwardly while being inclined toward the one end of the tubular element for connection with said central portion.

27. The unitary end closure of claim 26 wherein said central portion comprises a cylindrical element, said rigid beam structure comprising a triangular arrangement of three beams each connected at both ends with said annular ring means, said plurality of flexible beams comprising a flexible beam extending from each said rigid beam in generally tangential relation with said cylindrical element of said central portion.

28. The unitary end closure of claim 26 wherein said flexible beams are arranged in generally tangential relation with a cylindrical element of said central portion.

29. The unitary end closure of claim 23 wherein said flexible spring means comprises a plurality of flexible beams extending radially inwardly while being inclined toward the one end of the tubular element for generally tangential engagement with a cylindrical element of said central portion.

30. In a method for filling a cartridge with a generally compacted particulate filter medium through which a fluid is subsequently to be passed for performing a filtering operation, the cartridge including a tubular outer wall element and a first closure adapted for attachment to one end of the tubular element, the steps comprising:

attaching to the other end of the tubular element a unitary end closure integrally including annular ring means having means for attachment to the other end of the tubular element, an axially central portion and flexible spring means interconnecting the central portion with the annular ring means, the flexible spring means being adapted for flexure from a non-stressed condition into a stressed condition for applying axial force toward the one end of the tubular element, flexing and maintaining the flexible spring means in said stressed condition, operatively coupling fluid permeable means with the central portion, filling the tubular element with the filter medium and generally compacting the filter medium against the fluid permeable means, attaching the first closure to the one end of the tubular element, and releasing the flexible means for action against the filter medium to produce and maintain a compacting force on the filter medium sufficient to inhibit channeling or cavitation of the filter medium.

* * * * *